(12) United States Patent
Jang et al.

(10) Patent No.: US 9,069,789 B2
(45) Date of Patent: Jun. 30, 2015

(54) APPARATUS AND METHOD FOR MANAGING METADATA IN PORTABLE TERMINAL

(75) Inventors: Seok-Kyu Jang, Suwon-si (KR); Young-June Woo, Hwaseong-si (KR); Young-Hoon Min, Suwon-si (KR); Sin-Jae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1617 days.

(21) Appl. No.: 12/325,362

(22) Filed: Dec. 1, 2008

(65) Prior Publication Data

US 2009/0150464 A1 Jun. 11, 2009

(30) Foreign Application Priority Data

Dec. 5, 2007 (KR) .................. 10-2007-0125352

(51) Int. Cl.
G06F 7/00 (2006.01)
G06F 17/30 (2006.01)
(52) U.S. Cl.
CPC .............. *G06F 17/30218* (2013.01)

(58) Field of Classification Search
CPC ................. G06F 17/30578; G06F 17/30997; G06F 21/575
See application file for complete search history.

(56) References Cited

U.S. PATENT DOCUMENTS

| 2006/0107320 | A1 | 5/2006 | Bhatt et al. |
| 2006/0153036 | A1 | 7/2006 | Tomoda et al. |
| 2008/0005184 | A1* | 1/2008 | Myllyla et al. ................. 707/200 |
| 2008/0288096 | A1* | 11/2008 | Thanos et al. ................... 700/94 |
| 2009/0131028 | A1* | 5/2009 | Horodezky et al. ........... 455/418 |

FOREIGN PATENT DOCUMENTS

| CN | 1799101 A | 7/2006 |
| CN | 101044488 A | 9/2007 |
| WO | 2007/020857 A1 | 2/2007 |

* cited by examiner

*Primary Examiner* — Ann Lo
(74) *Attorney, Agent, or Firm* — Jefferson IP Law, LLP

(57) ABSTRACT

A method and apparatus for managing metadata in a portable terminal are provided. The method includes, upon insertion of an external memory, acquiring a unique identifier of an external memory, determining whether a record having information identical to information of a file included in the external memory exists if the unique identifier is identical to a previously stored unique identifier, and reusing metadata included in the record if the record exists.

18 Claims, 4 Drawing Sheets

APPARATUS AND METHOD FOR MANAGING METADATA IN PORTABLE TERMINAL

PRIORITY

This application claims the benefit under 35 U.S.C. §119 (a) of a Korean patent application filed in the Korean Intellectual Property Office on Dec. 5, 2007 and allocated Serial No. 10-2007-0125352, the entire disclosure of which is hereby incorporated by reference.

BACKGROUND OF THE INVENTION

1. Field of the Invention

The present invention relates to an apparatus and method for managing metadata in a portable terminal. More particularly, the present invention relates to an apparatus and method for efficiently managing files stored in an external memory of the portable terminal.

2. Description of the Related Art

With the development of electronic and communication industries over the years, portable terminals are now widely used. In response to user demands, portable terminals having various functions in addition to the main communication function are being developed.

For example, portable terminals are now available that can provide a variety of multimedia functions and services, such as a phone book function, a game function, a short message service, an e-mail service, a wake-up call function, an MPEG Layer 3 (MP3) player function, a digital camera function, a wireless internet service, etc.

As portable terminals become more efficient and multi functional, a large amount of data needs to be stored in an internal memory of the portable terminal to support the additional functions and increased efficiency. For storing the additional data, an external memory can be additionally used to overcome limitations of the internal memory of the portable terminal.

When an external memory is used with a portable terminal, metadata located in the external memory must be managed by the portable terminal. To manage metadata for a file which exists in the external memory, upon insertion of the external memory into the portable terminal, a file within the external memory is searched and analyzed. Metadata is extracted according to a request by an application with which the file is to be used, and the extracted metadata is stored in an internal space of the portable terminal (i.e. database, etc.). Thereby, a requested operation is performed. For example, for a music file, information comprising a genre, a musician, an album, etc. is extracted from the music file, and the extracted metadata is stored together with a name of each file. For an image file, information comprising a color, a composition, a generation time, etc. is extracted from the image file, and the extracted information is stored together with a name of each file.

However, an external memory has a considerably lower access speed as compared with an internal memory of the portable terminal. Thus, more time is needed to analyze a file and extract metadata from the file located in the external memory. In addition, upon removal of the external memory from the portable terminal, metadata stored in the portable terminal is removed. Thus, repetitive insertion and removal for the external memory increases overhead by repetitive extraction and removal of the metadata. Therefore, a need exists for an improved apparatus and method for managing metadata in a portable terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and method for managing metadata in a portable terminal.

Another aspect of the present invention is to provide an apparatus and method for determining whether an external memory inserted into a portable terminal comprises an external memory that has been previously inserted.

A further aspect of the present invention is to provide an apparatus and method for reusing existing metadata, upon insertion of an external memory into a portable terminal.

According to an aspect of the present invention, a method for managing metadata in a portable terminal is provided. The method includes, upon insertion of an external memory, acquiring a unique identifier of an external memory, determining whether a record having information identical to information of a file included in the external memory exists if the unique identifier is identical to a previously stored unique identifier, and reusing metadata included in the record if the record exists.

According to another aspect of the present invention, an apparatus for managing metadata in a portable terminal is provided. The apparatus includes a controller for, upon insertion of an external memory, acquiring a unique identifier of the external memory, if the unique identifier is identical to a previously stored unique identifier, determining whether a record having information identical to information of a file included in the external memory exists, and if the record exists, reusing metadata included in the record; and the external memory being inserted into or removed from the portable terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a method and apparatus for reusing metadata using a serial number of an external memory and a cluster number of a file in the external memory according to an exemplary embodiment of the present invention will be described.

Figure 1:
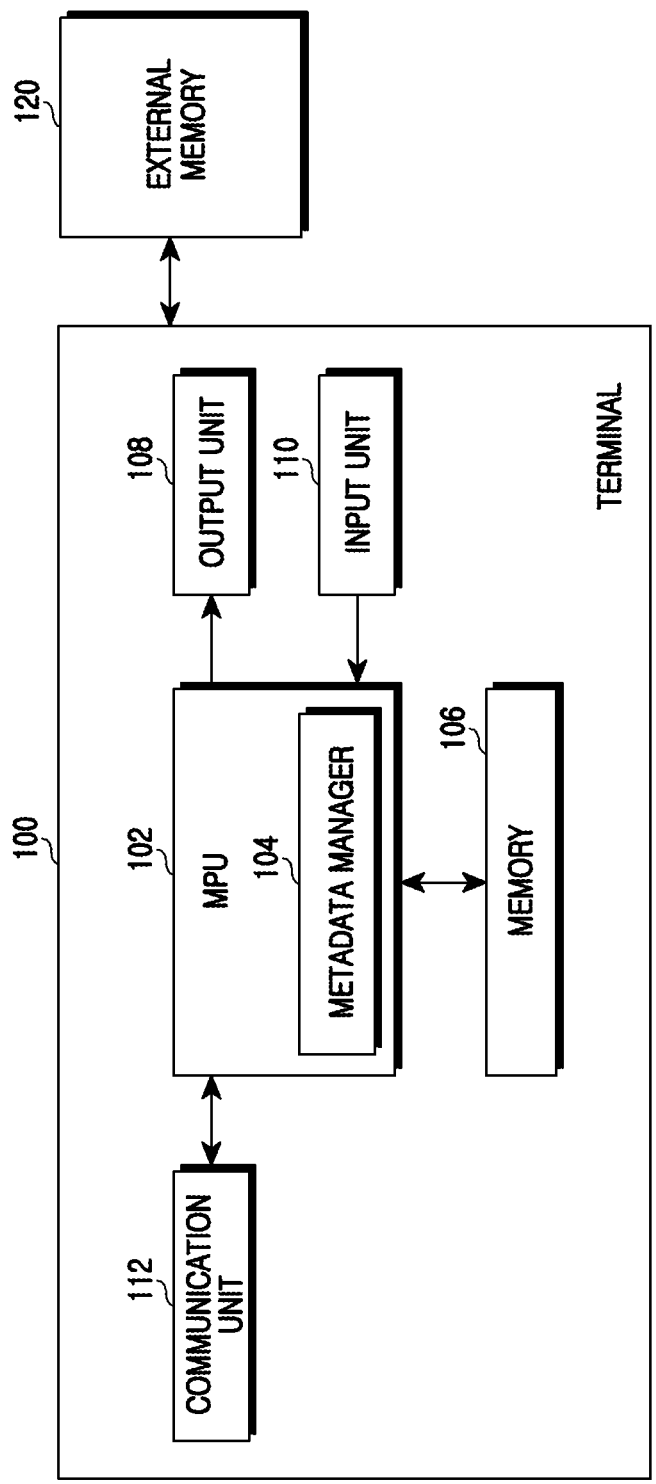
FIG. 1 illustrates a block diagram of a portable terminal for managing metadata according to an exemplary embodiment of the present invention.

FIG. 1 illustrates a block diagram of a portable terminal for managing metadata according to an exemplary embodiment of the present invention. The portable terminal 100 is configured to include a Micro-Processor Unit (MPU) 102, a metadata manager 104, a memory 106, an output unit 108, an input unit 110 and a communication unit 112. Further, an external memory 120, which is connected or disconnected according to the attachment or detachment of an external connecter (not shown) is included. In an exemplary implementation, the external memory is connected or disconnected by its attachment or detachment to or from the external connector that is located at one end of the portable terminal.

Referring to FIG. 1, the MPU 102 controls overall operations of the portable terminal, and includes the metadata manager 104. The MPU controls and processes functions regarding the use of metadata. For example, the MPU controls and processes functions for the reuse of metadata that has been previously generated and stored in the memory 106. In an exemplary implementation, the MPU uses information of an inserted external memory 120 and of a file stored in the inserted external memory 120 to control and process functions for reusing the metadata. For example the MPU may use a serial number of the inserted external memory 120 and a cluster number of a file stored in the external memory 120.

The memory 106 stores programs for controlling overall operations of the portable terminal. The memory 106 also stores temporary data that is generated during operations of the portable terminal as well as system parameters, programs and other data that is necessary for operations of the portable terminal. In addition, the memory 106 stores a log file for external memory and metadata according to an exemplary embodiment of the present invention.

The output unit 108 displays status information, numerals, characters and the like. In an exemplary implementation, the output unit 108 may be provided as a Liquid Crystal Display (LCD). In this case, the output unit 108 may include a controller for controlling the LCD, a video memory in which image data is stored and an LCD element. If the LCD is provided as a touch screen, the output unit 108 may perform a part or all of the functions of the input unit 110.

The input unit 110 is equipped with keys for inputting numerals or characters and function keys for setting various functions. Upon receipt of user input, the input unit 110 outputs functions corresponding to the keys input by the user, to the MPU 102.

Figure 2:
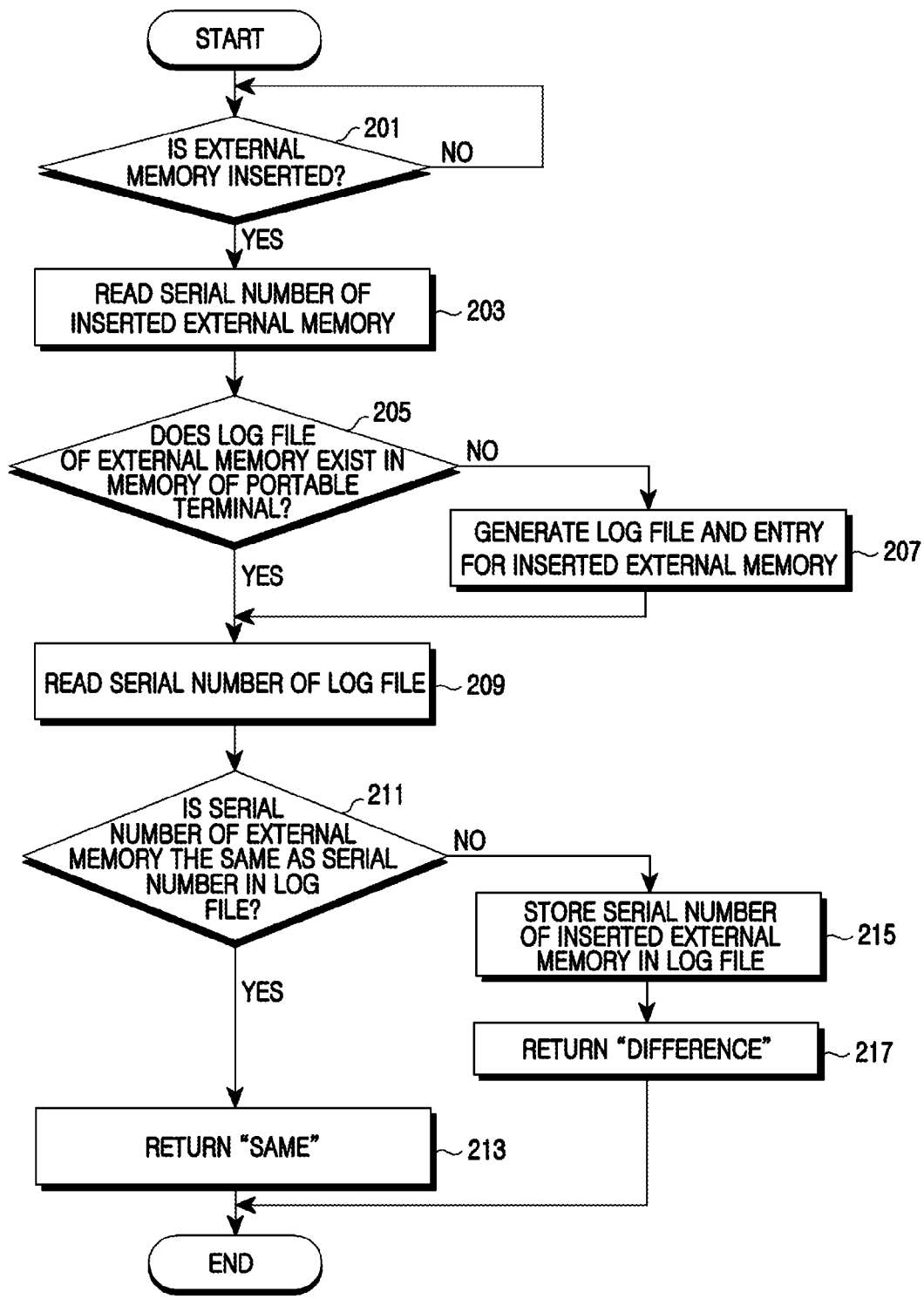
FIG. 2 is a flowchart of a procedure of comparing serial numbers upon insertion of an external memory into a portable terminal according to an exemplary embodiment of the present invention.

FIG. 2 is a flowchart of a procedure of comparing serial numbers upon insertion of an external memory into a portable terminal according to an exemplary embodiment of the present invention.

As illustrated in FIG. 2, the portable terminal determines whether an external memory is inserted in step 201. If it is determined that the external memory is inserted, the portable terminal proceeds to step 203 to read information of the inserted external memory. In an exemplary embodiment, the portable terminal reads a serial number of the external memory.

In step 205, the portable terminal determines whether a log file for external memory exists in a memory of the portable terminal. In an exemplary implementation, the log file for external memory includes a database or table in which information of external memory devices, such as their respective serial numbers, may be stored. If it is determined that the log file for external memory does not exist in the memory of the portable terminal, the portable terminal proceeds to step 207 to generate a log file for external memory. Furthermore, in step 207 the portable terminal generates an entry in the log file specific to the inserted external memory. In an exemplary implementation of generating an entry, the portable terminal stores a serial number of the inserted external memory in the generated log file. Then, the portable terminal proceeds to step 209.

If it is determined in step 205 that the log file for external memory does exist in the memory of the portable terminal, the portable terminal proceeds to step 209 to read information from the log file stored in the memory. As an example, the reading of information may include reading at least one serial number from the memory. In step 211, the portable terminal determines whether the log file includes information identical to the information of the inserted external memory.

If it is determined in step 211 that the identical information does exist in the log file, the portable terminal proceeds to step 213 to return the result "Same", and ends the process.

On the other hand, if it is determined that the identical information does not exist in the log file, the portable terminal proceeds to step 215 to store the information of the inserted external memory in the log file. In step 217, the portable terminal returns the result "Difference" and ends the process.

Figure 3:
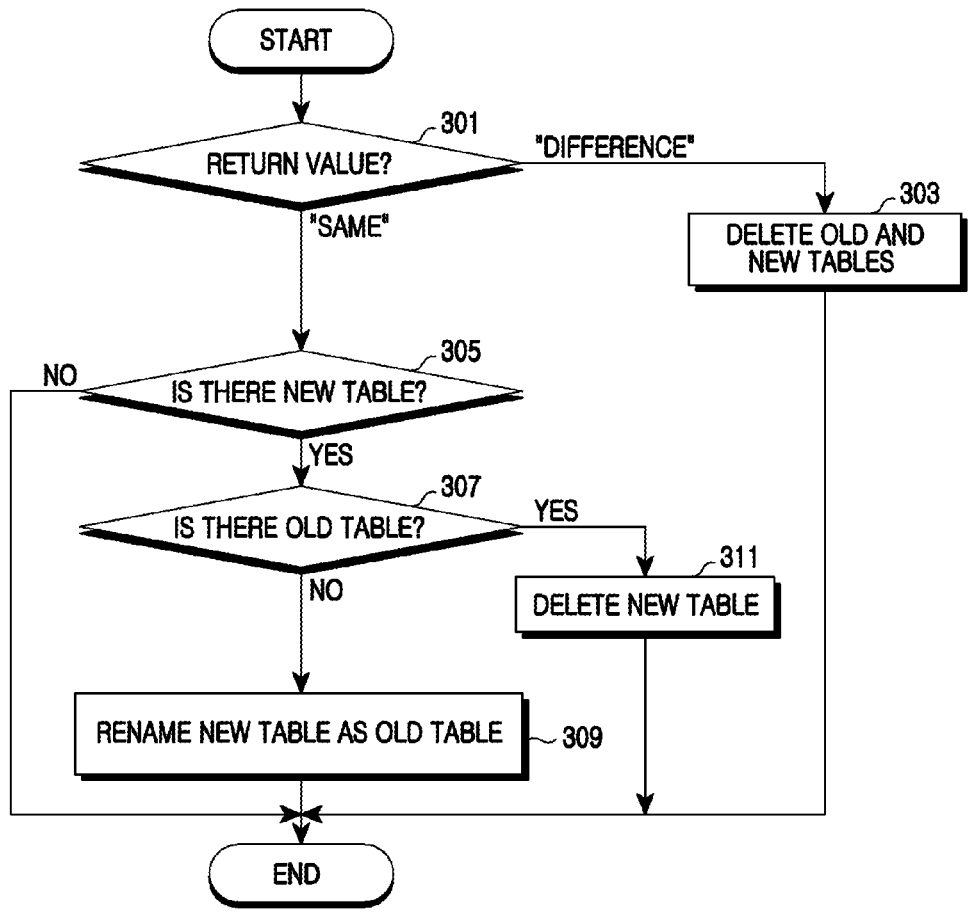
FIG. 3 is a flowchart of an operating procedure of a portable terminal in which an external memory is inserted according to an exemplary embodiment of the present invention.

FIG. 3 is a flowchart of an operating procedure of a portable terminal in which an external memory is inserted according to an exemplary embodiment of the present invention.

In the following description, the term "New table" denotes data in a database including metadata which is searched and generated in the external memory, after insertion of the external memory. That is, "New table" refers to data including metadata that is extracted from the external memory and stored in a database in the portable terminal when the external memory is inserted. The term "Old table" denotes data in a database located in the portable terminal and including metadata that was generated and stored prior to the insertion of the external memory.

In the following example, the metadata is stored in a format of a table and an assumption is made that the New table and the Old table may simultaneously exist.

Referring to FIG. 3, in step 301, the portable terminal determines a return value according to the procedure of FIG. 2. If the return value is "Difference", the portable terminal removes the New table and Old table in step 303 and ends the process. That is, since a table for a previously inserted memory (i.e. the Old table) is not the table for a currently inserted memory, as determined by receiving the return value of "Difference", the Old table is removed.

Alternatively, if the return value is "Same", the portable terminal determines whether the new table exists in step 305. If it is determined that the new table does not exist, the portable terminal ends the process. If it is determined that the new table does exist, the portable terminal proceeds to step 307 to determine whether the Old table exists. If it is determined in step 307 that the Old table exists, the portable terminal removes the New table in step 311 and ends the process.

If the Old table does not exist, the portable terminal proceeds to step 309 to rename the New table as the Old table and ends the process.

As illustrated above, in the case that the return value is "Same", an operation of the portable terminal is as shown in Table 1 below. That is, when a currently inserted external memory is identical to a previously inserted external memory, the Old table is reused. This situation occurs when there is both a New table and an Old table. On the other hand, when the currently inserted external memory is not identical to the previously inserted external memory, the Old table is not reused.

TABLE 1

| New table | Old table | Operation |
|---|---|---|
| Y | Y | Remove a New table |
| Y | N | Rename the New table as the Old table |
| N | Y | Terminate |
| N | N | Terminate |

Although not illustrated in FIG. 3, the process may additionally include a comparison of the New table with the Old table to determine if the New table includes metadata not included in the Old table. If the New table does include metadata not in the Old table, the Old table may be updated prior to deletion of the New table. Additionally, in an alternative implementation of step 303, only the Old table is deleted while the New table is maintained in the portable terminal. By not deleting the New table, its contents may be accessed by the portable terminal as needed.

Figure 4:
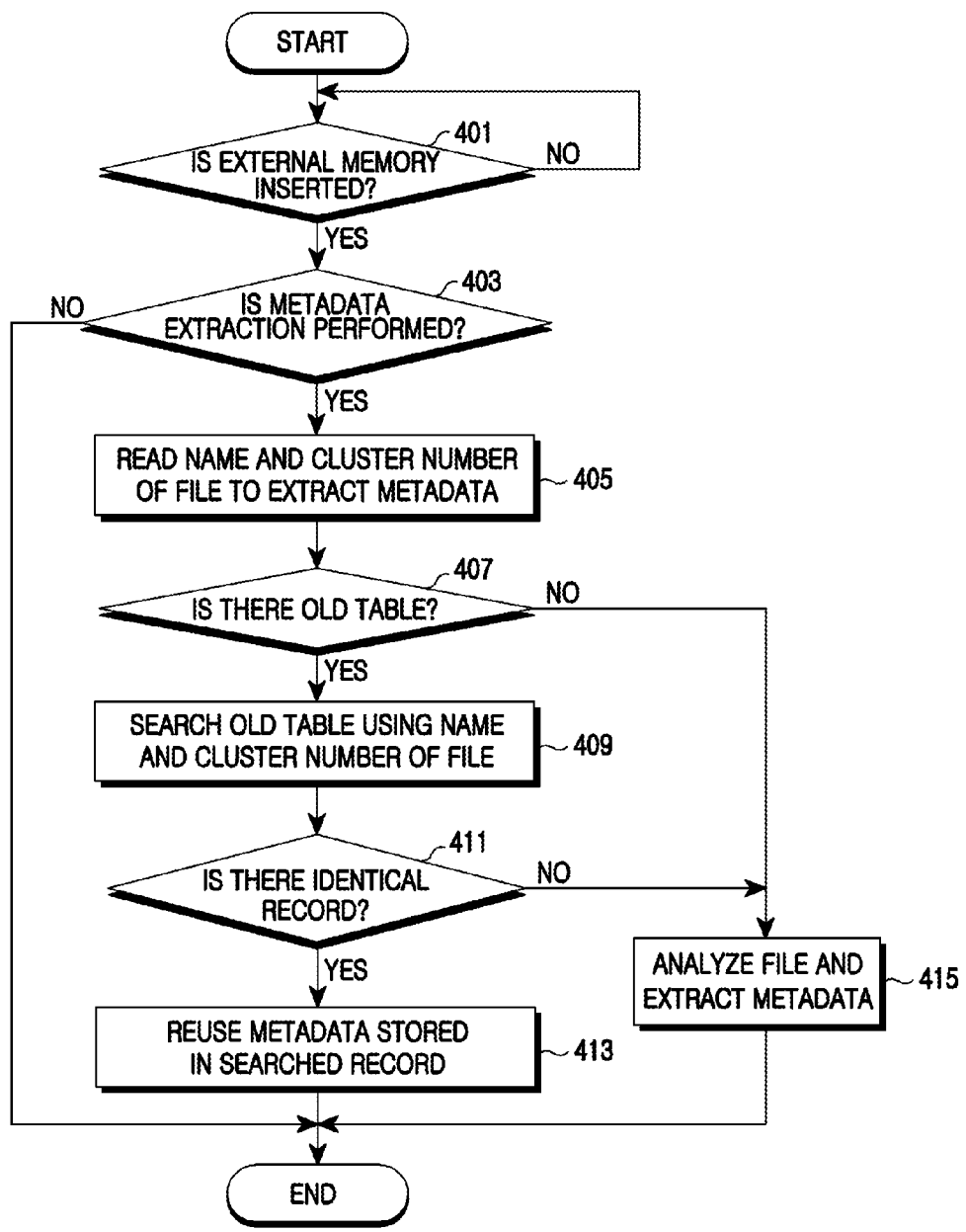
FIG. 4 is a flowchart of a procedure of extracting metadata from an external memory inserted into a portable terminal according to an exemplary embodiment of the present invention.

FIG. 4 is a flowchart of a procedure of extracting metadata from an external memory inserted into a portable terminal according to an exemplary embodiment of the present invention.

Referring to FIG. 4, in step 401 it is determined if an external memory is inserted in the portable terminal. It is noteworthy to point out that steps 201 of FIG. 2 and 401 of FIG. 4 both determine if an external memory is inserted in the portable terminal and that these steps may be performed simultaneously. In an exemplary implementation, it is expected that the processes of FIGS. 2 and 4 will begin upon the same initiation event (insertion of external memory) while the process of FIG. 2 will necessarily conclude prior to certain steps of FIG. 4, for example step 407. This will be explained in more detail below. If it is determined that an external memory is inserted in step 401, the portable terminal proceeds to step 403 to determine whether an operation of extracting metadata is to be performed. Here, the operation of extracting metadata is performed when an application requests to use a file of the inserted external memory and to extract metadata for the file.

If it is determined in step 403 that the metadata extraction is not to be performed, the portable terminal ends the process.

Alternatively, if it is determined in step 403 that the metadata extraction is to be performed, the portable terminal reads information of the file to be used in order to extract the associated metadata in step 405. In an exemplary embodiment, the information read by the portable terminal may include the file name and cluster number.

In step 407, the portable terminal determines whether an Old table exists. As discussed above, although the process of FIGS. 2 and 4 may initiate concurrently, the process of FIG. 2, as well as the process of FIG. 3, must be completed prior to or at least concurrently with step 407. If it is determined that the Old table does not exist, the portable terminal proceeds to step 415. On the other hand, if it is determined that the Old table does exist, the portable terminal proceeds to step 409 to search the Old table using the information of the file.

In step 411, the portable terminal determines whether the Old table includes a record identical to the information of the file. In an exemplary implementation, the portable terminal determines if both the name of the file and cluster number of the file are identical to a record in the Old table.

Herein, the record, which is a term used in relation to database configuration, indicates an element in a table in the database. Information included in the record indicates a name of a file and a cluster number of the file.

If it is determined that the Old table does not include the identical record with the information of the file, the portable terminal proceeds to step 415 to analyze the file and extract metadata of the file from the external memory. Here, the file that is analyzed refers to a file that is requested by the application.

Meanwhile, if the Old table includes an identical record with the information of the file, the portable terminal proceeds to step 413 to reuse metadata stored in the identical record. Then, the portable terminal ends the process.

As described above, exemplary embodiments of the present invention can provide for the reuse of metadata using a serial number of an external memory and a cluster number of a file in the external memory, thereby minimizing problems associated with the extracting of metadata due to attachment of the external memory and increasing the effective management of the metadata.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing metadata in a portable terminal, the method comprising:
   acquiring a unique identifier of an external memory upon insertion of the external memory;
   determining if the unique identifier is identical to a previously stored unique identifier;
   if the unique identifier is identical to the previously stored unique identifier, determining whether a record having information identical to information of a file included in the external memory exists; and
   if the record exists, reusing metadata included in the record.

2. The method of claim 1, wherein the metadata comprises metadata for a file of a previously inserted external memory.

3. The method of claim 1, further comprising:
if the unique identifier is not identical to the previously stored unique identifier, deleting at least one of a new table and an old table for the external memory; and
extracting metadata of the file from the external memory.

4. The method of claim 1, wherein the determining of whether the record having information identical to information of the file included in the external memory exists, comprises:
deleting a new table if the new table and an old table for the external memory exist; and
determining whether the old table comprises the record identical to the information of the file included in the external memory.

5. The method of claim 4, further comprising updating the old table with additional data from the new table if it is determined that the new table includes additional data not listed in the old table.

6. The method of claim 1, wherein the determining of whether the record having information identical to information of the file included in the external memory exists, comprises:
changing a new table into an old table if the new table for the external memory exists and the old table for the external memory does not exist; and
determining whether the old table includes the record identical to the information of the file included in the external memory.

7. The method of claim 1, wherein the information identical to the information of the file comprises a name of the file and a cluster number of the file.

8. The method of claim 1, the unique identifier comprises a serial number.

9. The method of claim 1, further comprising:
determining if a log file for external memory exists in a memory of the portable terminal; and
if the log file does not exist, generating a log file for external memory,
wherein the determining if the unique identifier is identical to a previously stored unique identifier comprises reading the unique identifier from the log file.

10. An apparatus for managing metadata in a portable terminal, the apparatus comprising:
a controller for, upon insertion of an external memory, acquiring a unique identifier of the external memory, if the unique identifier is identical to a previously stored unique identifier, determining whether a record having information identical to information of a file included in the external memory exists, and if the record exists, reusing metadata included in the record,
wherein the external memory is inserted into or removed from the portable terminal.

11. The apparatus of claim 10, wherein the metadata comprises metadata for a file of a previously inserted external memory.

12. The apparatus of claim 10, wherein the controller deletes at least one of a new table and an old table for the external memory and extracts metadata of the file from the external memory if the unique identifier is not identical to the previously stored unique identifier.

13. The apparatus of claim 10, wherein to determine whether the record having information identical to the information of the file included in the external memory exists, the controller deletes a new table if the new table and an old table exist and determines whether the old table comprises the record identical to the information of the file included in the external memory.

14. The apparatus of claim 13, wherein the old table is updated with additional data from the new table if it is determined that the new table includes additional data not listed in the old table.

15. The apparatus of claim 10, wherein to determine whether the record having information identical to the information of the file included in the external memory exists, the controller changes a new table into an old table if the new table for the external memory exists and the old table for the external memory does not exist, and determines whether the old table comprises the record identical to the information of the file included in the external memory.

16. The apparatus of claim 10, wherein the information identical to the information of the file comprises a name of the file and a cluster number of the file.

17. The apparatus of claim 10, wherein the unique identifier comprises a serial number.

18. The apparatus of claim 10, wherein the controller determines if a log file for external memory exists in a memory of the portable terminal and, if the log file does not exist, generates a log file for external memory, further wherein, to determine if the unique identifier is identical to a previously stored unique identifier, the controller reads the unique identifier from the log file.

* * * * *